(12) United States Patent
Conway (10) Patent No.: US 11,970,754 B2
(45) Date of Patent: Apr. 30, 2024

(54) METAL RECOVERY SYSTEM AND METHOD

(71) Applicant: Best Process Solutions, Inc., Brunswick, OH (US)

(72) Inventor: Timothy F. Conway, Hinckley, OH (US)

(73) Assignee: BEST PROCESS SOLUTIONS, INC., Brunswick, OH (US)

( * ) Notice: Subject to any disclaimer, the term of this patent is extended or adjusted under 35 U.S.C. 154(b) by 358 days.

(21) Appl. No.: 17/584,606

(22) Filed: Jan. 26, 2022

(65) Prior Publication Data

US 2022/0145419 A1  May 12, 2022

Related U.S. Application Data

(63) Continuation of application No. 16/351,571, filed on Mar. 13, 2019, now abandoned, which is a
(Continued)

(51) Int. Cl.
| | | |
|---|---|---|
| B03B 9/04 | (2006.01) | |
| B02C 17/10 | (2006.01) | |
| B02C 17/14 | (2006.01) | |
| B02C 17/18 | (2006.01) | |
| B02C 23/10 | (2006.01) | |
| B02C 23/14 | (2006.01) | |

(Continued)

(52) U.S. Cl.
CPC ............ C22B 1/248 (2013.01); B02C 17/10 (2013.01); B02C 17/14 (2013.01); B02C 17/1855 (2013.01); B02C 23/10 (2013.01); B02C 23/14 (2013.01); B03B 9/04 (2013.01); B03B 9/061 (2013.01); C22B 1/005 (2013.01); C22B 15/0006 (2013.01); C22B 21/0007 (2013.01); B03B 2009/068 (2013.01); Y02P 10/20 (2015.11); Y02W 30/52 (2015.05)

(58) Field of Classification Search
CPC ................................ C22B 1/248; C22B 1/005
USPC ........................................................ 241/24.15
See application file for complete search history.

(56) References Cited

U.S. PATENT DOCUMENTS

| | | | |
|---|---|---|---|
| 2,965,316 A | 12/1960 | Henderson et al. | |
| 4,077,847 A | 3/1978 | Choi | |

(Continued)

FOREIGN PATENT DOCUMENTS

| | | |
|---|---|---|
| DE | 198 52 139 A1 | 5/2000 |
| EP | 0760258 A1 | 3/1997 |

(Continued)

OTHER PUBLICATIONS

International Search Report and Written Opinion of the International Searching Authority dated Sep. 27, 2016 of corresponding International Application No. PCT/US2016/036545, filed Jun. 9, 2016.

(Continued)

*Primary Examiner* — Adam J Eiseman
*Assistant Examiner* — Fred C Hammers
(74) *Attorney, Agent, or Firm* — Pearne & Gordon LLP (57) ABSTRACT

A method and apparatus to reclaim metals from scrap material such as automobile shredder residue (ASR) that, after separating out light density components, separates out friable material such as rock and glass by crushing and screening operations to generate a high metal content product.

17 Claims, 4 Drawing Sheets

Related U.S. Application Data continuation of application No. 14/741,487, filed on Jun. 17, 2015, now Pat. No. 10,273,559.

(51) Int. Cl.

| | | |
|---|---|---|
| *B03B 9/06* | (2006.01) | |
| *C22B 1/00* | (2006.01) | |
| *C22B 1/248* | (2006.01) | |
| *C22B 15/00* | (2006.01) | |
| *C22B 21/00* | (2006.01) | |

(56) References Cited

U.S. PATENT DOCUMENTS

| | | | |
|---|---|---|---|
| 4,210,290 A | 7/1980 | Andersson | |
| 4,252,577 A * | 2/1981 | Malard | B22F 9/04 |
| | | | 419/33 |
| 4,625,921 A | 12/1986 | Blundell | |
| 4,747,547 A | 5/1988 | Harada | |
| 4,815,667 A | 3/1989 | Keller | |
| 5,427,607 A | 6/1995 | Cristovici | |
| 5,468,291 A | 11/1995 | Waterson | |
| 8,757,523 B2 | 6/2014 | Valerio | |
| 2004/0050211 A1 | 3/2004 | Stratigos | |
| 2010/0005926 A1 | 1/2010 | Valerio | |
| 2011/0147501 A1 | 6/2011 | Valerio | |
| 2012/0037733 A1 | 2/2012 | Gitschel | |
| 2012/0048975 A1 | 3/2012 | Gitschel | |
| 2013/0181075 A1 | 7/2013 | Pickens | |
| 2014/0077008 A1 | 3/2014 | Valerio | |
| 2014/0299516 A1 | 10/2014 | Valerio | |
| 2015/0136662 A1 | 5/2015 | Valerio | |

FOREIGN PATENT DOCUMENTS

| | | |
|---|---|---|
| EP | 0 997 202 A2 | 5/2000 |
| EP | 1076206 A1 | 2/2001 |
| GB | 1513511 A | 6/1978 |
| JP | 09316556 A | 12/1997 |
| WO | 2015054498 A1 | 4/2015 |

OTHER PUBLICATIONS

"Recycling of a fine, heavy fluff automobile shredder residue by density and differential fragmentation", M. R. Gent et al., Waste Management 43 (2015) pp. 421-433, Available online Jun. 25, 2015.

* cited by examiner

METAL RECOVERY SYSTEM AND METHOD

This application is a continuation of application Ser. No. 16/351,571, filed Mar. 13, 2019, which application is a continuation of Ser. No. 14/741,487, filed Jun. 17, 2015, now U.S. Pat. No. 10,273,559, issued on Apr. 30, 2019.

BACKGROUND OF THE INVENTION

The invention involves the recovery of metal from mixtures of diverse materials.

PRIOR ART

The invention has application, among others, to recovery of metal from automobile shredder residue (ASR). Such residue is the byproduct of systems that shred essentially whole automobiles, white goods and mixed metals to reclaim their component materials, mostly their metal content. Typically, such material is shredded into small pieces which are processed through various types of material separation devices. These devices include, for example, magnetic separators, eddy current separators, and induction sorters to collect various metals. Plastics can be air separated from heavy material on the basis of density.

Current shredding and metal reclaiming systems produce a fraction of ASR waste of particulate materials of, say, between 0 to 12 and 0 to 25 mm that is sent, primarily, to landfills. It has been estimated that currently 9 million tons of ASR is disposed of each year in the U.S.A. The general consensus in the industry is that in these smaller fractions, it is not practical to recover significant metal content from the ASR that is currently discarded into landfills. It has been estimated that $600 million of metal content is being sent to landfills annually in the U.S.A. because of a previous lack of a practical process and system to reclaim these metals.

SUMMARY OF THE INVENTION

The invention provides a process and apparatus that effectively and economically reclaims metals from ASR and other currently discarded materials such as industrial, commercial and residential incinerator bottom ash. In accordance with one aspect of the invention, ASR material is initially separated into streams of different particle size prior to separating various component materials. In accordance with another aspect of the invention, the ASR material is preliminarily separated on the basis of particle density. In accordance with still another aspect of the invention, the ASR is processed through a rod mill to crush the friable material content into particle sizes that enable effective screen separation of the crushed friable material from non-crushed, non-friable metal materials. In another aspect of the invention, material is directed to two successive rod mills each followed by a screening. Practice of the invention can involve one or more of the foregoing aspects, as well as additionally disclosed aspects.

DESCRIPTION OF THE PREFERRED EMBODIMENT

Metals laden waste particulate, nominally 25 mm and below, with a mixture of organics, rock, glass, wire, metal fragments, wood and fibers is a typical feed material for the disclosed process. A source of such material is automotive shredder residue or ASR. The disclosed process is expected to produce at least a 90%, and ideally up to about a 98% plus, metal recovery, with minimal process losses.

Figure 1A:
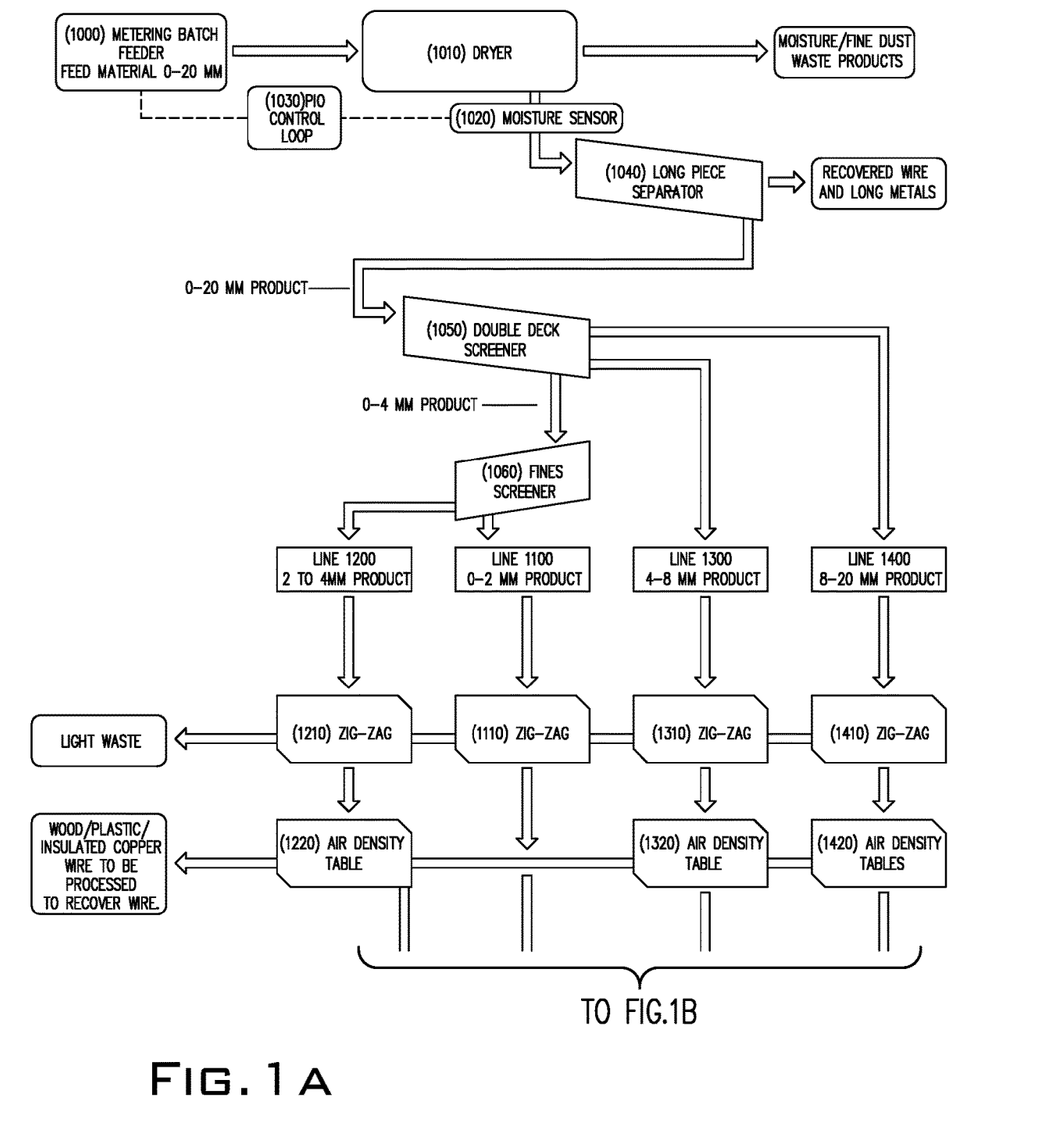
FIGS. 1A and 1B are partial views that show one complete view of a flow diagram of a preferred system for practicing the invention.
Figure 1B:
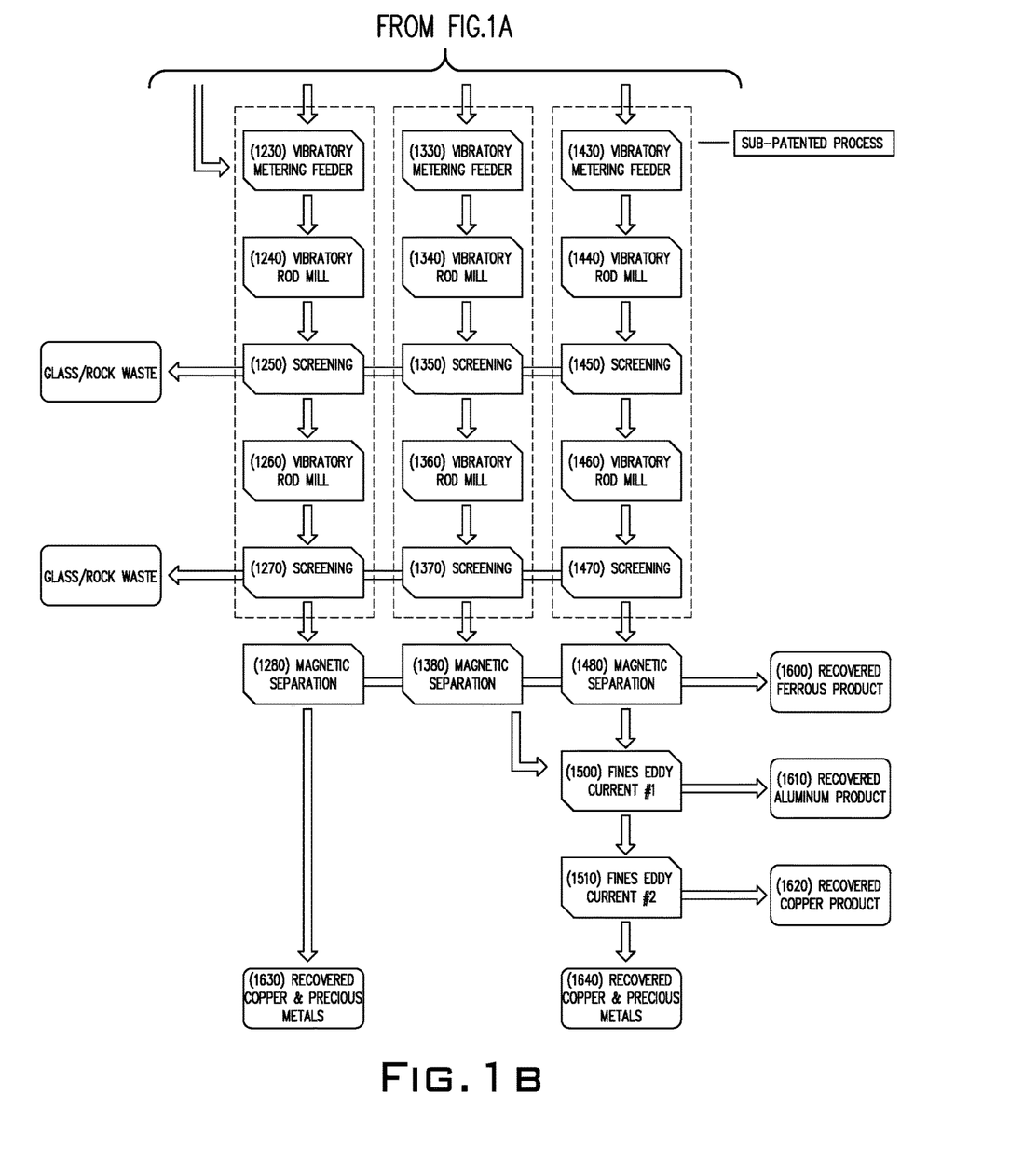

The following text references 4 digit process/apparatus identifiers in FIG. 1. The particle size groups and the maximum particle size used in the following disclosure is by way of example, not limitation.

Process 1000—Metering, Drying and Screening

1000—Metering Drum Feeder—The recovery process is very dependent on the material being metered at an even and consistent flow rate. The metering drum feeder (1000) incorporates a feed hopper for receiving and holding a large quantity of feed material. Fitted to the discharge end of the hopper is a hexagonal rotating drum that can be mechanically raised and lowered via powered screw jacks. By raising and lowering the screw jacks the material flow depth can be increased or decreased depending on the desired flow rate. Below the feed hopper and hexagonal rotating drum is a vibrating pan feeder to meter the material under the hexagonal drum to the next process (1010). The vibrating pan feeder is controlled by a variable speed drive to enable the increase or decrease in feed rate automatically via a PID (proportional-integral-derivative) loop control (1030) coupled to a moisture monitoring sensor (1020) located after the dryer (1010). Other metering systems may be incorporated.

1010—The rotary dryer is a known type of industrial dryer employed to reduce or minimize the liquid moisture content of the material it is handling by bringing it into direct contact with a heated gas. The dryer is made up of a large, rotating cylindrical tube, usually supported by concrete columns or steel beams. The dryer slopes slightly so that the discharge end is lower than the material feed end in order to convey the material through the dryer under gravity. Material to be dried enters the dryer, and as the dryer rotates, the material is lifted up by a series of internal fins lining the inner wall of the dryer. When the material gets high enough to roll back off the fins, it falls back down to the bottom of the dryer, passing through the hot gas stream as it falls. This gas stream can either be moving toward the discharge end from the feed end (known as co-current flow), or toward the feed end from the discharge end (known as counter-current flow). The gas stream can be made up of a mixture of air and combustion gases from a burner, in which case the dryer is called a direct heated dryer. Alternatively, the gas stream may consist of air or another (sometimes inert) gas that is preheated. When the gas stream is preheated by some means where burner combustion gases do not enter the dryer, the dryer is known as an indirect-heated type. Often, indirect heated dryers are used when product contamination is a concern. In some cases, combinations of direct-indirect heated rotary dryers are also available to improve the overall efficiency.

1040—Long Piece Separator—This linear screening machine has a flat receiving plate to receive the feed material and evenly introduce the feed material to the "double nose"

type screen deck. This screening deck allows the removal of long pieces of wire, wood, rods and other large foreign objects. The screen deck is mechanically clamped into the screen body in which the vibratory energy is transmitted thru the screen body into the screen deck to cause the material to be conveyed and screened at the same time. The overs are considered "longs" and may be further processed to recover valuable metals. The "unders" will continue to screener (1050).

1050—Double Deck Screener—This vibratory screen is based on a resonance system. The inner frame of the screen is set in motion as a result of the motion of the screen body putting the screen panels in a high vertical motion. The linear or circular motion of the screen is producing an acceleration of the screen deck, which can be higher than any other screen (>50 g). This way the screen deck is kept clean and the highest screen efficiency can be achieved even with heavy materials. The top deck is fitted with 8 mm screen openings to generate the material for Line 1400, which is +8 mm material. Throughout this description, unless otherwise noted, material dimensions are nominal particle size. The lower deck is fitted with 4 mm screen openings to generate the material for Line 1300, which is 4-8 mm material. Fines (−) 4 mm material is discharged to the fines screener (1060) for further size separation

1060—Fines Screener—This linear screening machine has a flat receiving plate to receive the feed material and evenly introduce the feed material to the "woven screen material" type screen deck. This type of screening deck allows the over-sized material to be segregated from smaller particles. The screen deck is mechanically clamped into the screen body in which the vibratory energy is transmitted thru the screen body into the screen deck to cause the material to be conveyed and screened at the same time. Fitted with 2 mm screen openings, the oversize material will feed Line 1200, which is +2 mm material. The under-sized material will feed Line 1100, which is −2 mm material.

Process 1100—Air Separation of the 0-2 mm Material

1110—Zig-Zag Air Separator—The feed material (0-2 mm) is conveyed into an air-tight chamber to the separator channel. According to the multiple-cross flow-separating process, light material is separated from heavy material. The air stream required for separation is blown through the separation channel from bottom to top. The air stream carries light material. Heavy material falls through the air stream and is discharged through the separator base and is feed material for the metering feeder (1230). The light material transported by the air stream to a cyclone gets separated there and is discharged via rotary gate valve. Zig Zag Air Separators are usually operated in recirculation air mode, whereby the cleaned air is returned via blower to the separator base. In case of dusty or moist products the operation of the plant is also possible in partial air circulation or suction mode. A radial blower generates the required air stream and pressure.

Process 1200—Air Separation, Air Density Separation, Particle Separation and Magnetic Separation of the 2-4 mm Material

1210—Zig-Zag Air Separator—The feed material (2-4 mm) is conveyed into a separator as described in process 1110. Separated heavy material is feed material for an air density table (1220).

1220—Air Density Table—Particles of different specific weights are separated on a fluidized bed vibrating table. The product is fed onto the separation table a dosing feeder with charging hopper. The material flow can be continuously adjusted by the speed controller, to evenly distribute material over the whole width of machine. The adjustable air flow (pressure side) is fed under the separating table over the screen segment. The combined effects of the vibration of the table, as well as the air flow from below, nearly eliminates the friction between the particles. The particle mass thereby behaves like a fluid. That means heavy (high bulk density) particles sink, while light (low bulk density) particles swim on top of the flow. The slope of the table is arranged so that there is an incline from the light particle side to the heavy particle side. The sinking heavy particles are finally conveyed up the incline via vibrating process in direction of the upper discharge and become the feed material for the vibratory metering feeder (1230). The floating lighter particles follow the incline down to the lower discharge and may be processed further to recover additional metal fines. The dusty discharged air from the separation table is cleaned by a cyclone and/or filter.

1230—Vibratory Metering Feeder—The product is fed into the vibrating rod mill (1240), via vibratory metering feeder with charging hopper. The material flow can be continuously adjusted by speed controller, to evenly meter the product into the machine (1240).

1240—Vibratory Rod Mill/Separator—The vibrating rod mill receives the material via the vibratory metering feeder (1230). The vibratory rod mill's main tubular body, referred to as the milling chamber, is fitted with a vibratory exciter to generate circular motion along the length of the machine. Within the tubular body of the mill are a number of round and or square bars. When the vibratory energy is imparted on the milling chamber, the bars, which are within the chamber, are caused to circulate while also being caused to impact one another. The complete vibrating body is supported via a spring or rubber isolation system to eliminate the transmission of the vibratory energy to surrounding structures. In addition, the milling chamber can be inclined, or declined, to increase or decrease the material retention time. The chamber is also fitted with dust exhaust ports to vent and extract any dust that may be generated during the milling process. When friable (glass & rock) and non-friable (precious metals) materials are fed into the milling chamber the material becomes entrapped between the circulating bars causing the friable materials to be pulverized while the non-friable material remains in its original state. This allows for the effective separation of the non-friable product during the screening step (1250)

1250—Screening is as described at process 1060. The overs material will feed the secondary vibratory rod mill (1260). The under-sized material is a glass/rock waste material.

1260—Vibratory Rod Mill/Separator—This unit is as described in process 1240. The arrangement produces effective separation of the non-friable product during the screening step (1270). This process of vibratory milling and screening can be continued to increase process throughput.

1270—Screening is as described in process 1060. The overs material will be further processed with magnetic separation (1280) The under-sized material is a glass/rock waste material.

1280—Magnetic Separation—Magnetic head pulleys are incorporated into the transfer belt conveyors to remove magnetic materials (1600). As magnetic material nears the separator's magnetic field, it is attracted and held to the conveyor belt until it reaches the conveyor underside, where it passes out of the magnetic field and discharges into a chute or bin. The cleaned, contaminant-free, non-magnetic material, discharges from the top of the conveyor, away from the magnetic materials and are considered recovered copper and precious metals (1630). The magnetic material is recovered ferrous product (1600).

Process 1300—Air Separation, Air Density Separation, Particle Separation and Magnetic Separation of the 4-8 mm Material

1310—Zig-Zag Air Separator—The feed material (4-8 mm) is conveyed into a separator as described in process 1110. Separated heavy material is feed material for an air density table (1320).

1320—Air Density Table—Particles of different specific weights are separated as described in process 1220. Heavy particles become the feed material for a vibratory metering feeder (1330).

1330—Vibratory Metering Feeder—The product is fed into the vibrating rod mill (1340), via vibratory metering feeder with charging hopper. The material flow can be continuously adjusted by speed controller, to evenly meter the product into the machine (1340).

1340—Vibratory Rod Mill/Separator—This unit is as described in process 1240. The vibrating rod mill receives the material via the vibratory metering feeder (1330). The arrangement produces effective separation of the non-friable product during a screening step (1350).

1350—Screening is as described in process 1060. The overs material will feed the secondary vibratory rod mill (1360) The under-sized material, is a glass/rock waste material.

1360—Vibratory Rod Mill/Separator—This unit is as described in process 1240. The vibrating rod mill receives the material via the screener (1350). This arrangement produces effective separation of the non-friable product during a screening step (1370). This process of vibratory milling and screening can be continued to increase process throughput.

1370—Screening is as described at process 1060. The overs material will be further processed with magnetic separation (1380). The under-sized material is a glass/rock waste material.

1380—Magnetic Separation is the same as described at 1280. The cleaned, contaminant-free, non-magnetic material, discharges from the top of the conveyor, away from the magnetic materials and is further processed in a fines eddy current #1 (1500). The magnetic material is recovered ferrous product (1600).

Process 1400—Air Separation, Air Density Separation, Particle Separation and Magnetic Separation of the 8-20 mm Material

1410—Zig-Zag Air Separator—The feed material (8-20 mm) is conveyed into a separator as described in process 1110. Heavy material is feed material for an air density table (1420).

1420—Air Density Table—Particles of different specific weights are separated as described in process 1220. Heavy particles become the feed material for a vibratory metering feeder (1430).

1430—Vibratory Metering Feeder—The product is fed into the vibrating rod mill (1440) via vibratory metering feeder with charging hopper. The material flow can be continuously adjusted by the speed controller, to evenly meter the product into the machine (1440).

1440—Vibratory Rod Mill/Separator—This unit is as described in process 1240. The vibrating rod mill receives the material via the vibratory metering feeder (1430). This arrangement produces effective separation of the non-friable product during a screening step (1450).

1450—Screening is as described at process 1160. The overs material will feed a secondary vibratory rod mill (1460). The under-sized material is a glass/rock waste material.

1460—Vibratory Rod Mill/Separator—This unit is as described in process 1240. The vibrating rod mill receives the material via the screener (1450). The arrangement produces effective separation of the non-friable product during a screening step (1470). This process of vibratory milling and screening can be continued to increase process throughput.

1470—Screening is as described in process 1060. The overs material will be further processed with magnetic separation (1480). The under-sized material is a glass/rock waste material.

1480—Magnetic Separation is the same as described at 1380.

Process 1500—Eddy Current Separation

1500—Fines Eddy Current #1 (Aluminum Recovery)—An eddy current separator uses a powerful magnetic field to separate aluminum metals from the product stream after all ferrous metals have been removed via magnetic separation (1380 & 1480). The device makes use of eddy currents to effect the separation. The eddy current separator is applied to a conveyor belt carrying a thin layer of mixed metal product. At the end of the conveyor belt is an eddy current rotor. Aluminum metals are the most reactive to eddy current, thus will be thrown the greatest distance over a splitter gate. The recovered aluminum (1610) will be collected into a product bin. The less reactive metals simply fall off the belt due to gravity and are processed in fines eddy current #2 (1510).

1510—Fines Eddy Current #2 (Copper Recovery)—With the aluminum removed via fines eddy current #1 (1500), a secondary eddy current separator uses a powerful magnetic field to separate copper metals from the product stream. The device makes use of eddy currents to effect the separation. The eddy current separator is applied to a conveyor belt carrying a thin layer of mixed metal product. At the end of the conveyor belt is an eddy current rotor. Copper metals are the second most reactive to eddy current, thus will be thrown the greatest distance over a splitter gate. The recovered copper (1620) will be collected into a product bin. The less reactive metals simply fall off the belt due to gravity and are considered recovered precious metals (1640).

The streams of the high density fractions of ASR material in the paths directed to the vibratory metering feeders (1230, 1330, 1430) from the Zig-Zag Separator (1110) and air density tables (1220, 1320 and 1420) has a typical bulk density of about 70 to about 100 lbs/ft$^3$ and frequently between about 80 to about 90 lbs/ft$^3$.

Figure 2:
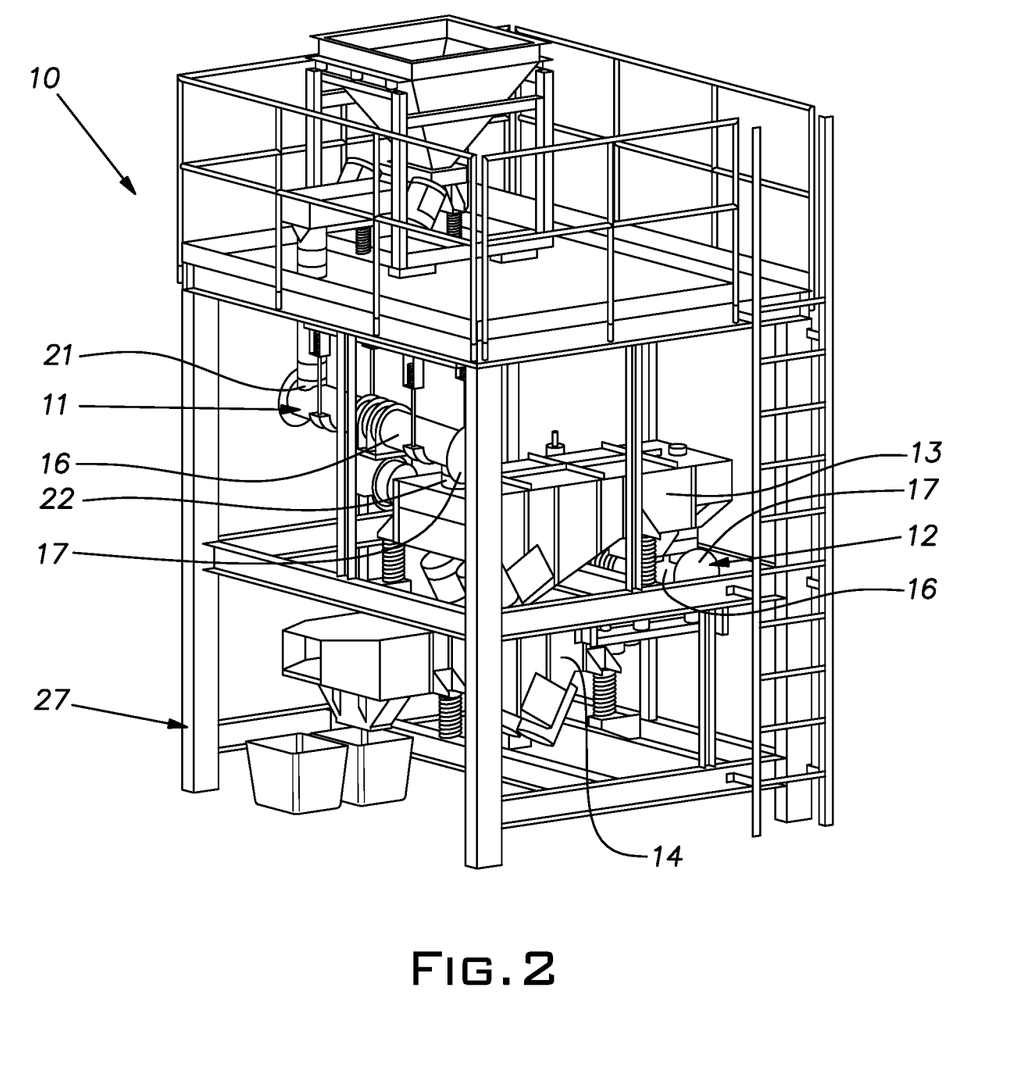
FIG. 2 is an isometric view of a material crushing and screen separating station.

FIG. 2 illustrates a pair of tandem rod mills 11, 12 of a crushing and separating station 10 discussed in sections 1240, 1260; 1340, 1360; 1440, 1460 above. The output of each mill 11, 12 is processed by a screen 13, 14 described in sections 1250, 1270; 1350, 1370 and 1450, 1470. The size and configuration of each rod mill 11, 12 can be different depending on, for example, the expected throughput at a particular stream of material.

In general, the screen opening size of the screens 13, 14 is the same in the several streams of particle size, described above at 1250, 1270, 1350, 1370 and 1450, 1470 and can be between 0.7 and 1.5 mm and, preferably, is nominally 1 mm.

Figure 3:
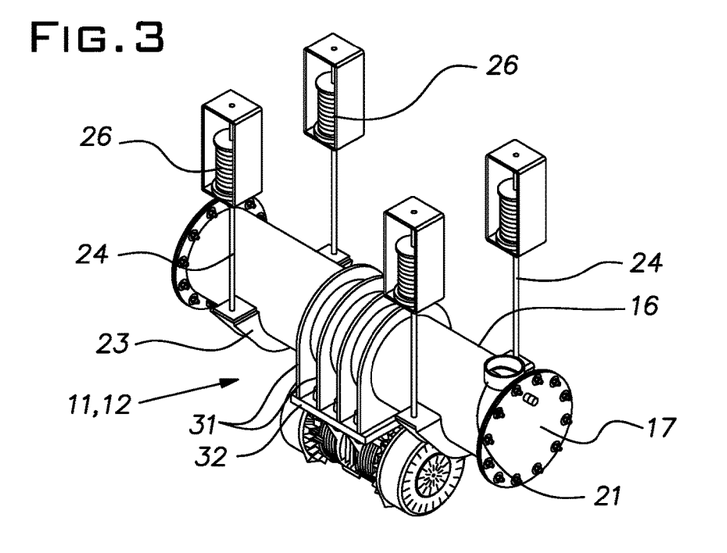
FIG. 3 is an isometric view of a rod mill separator.
Figure 4:
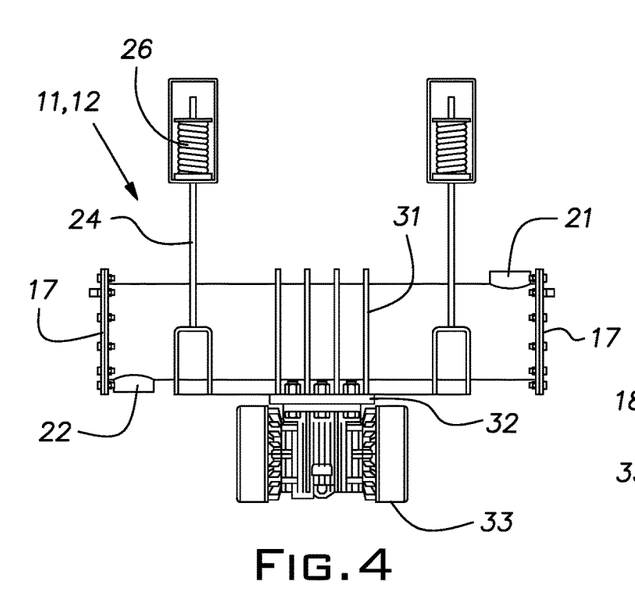
FIG. 4 is a side view of the rod mill of FIG. 3.
Figure 5:
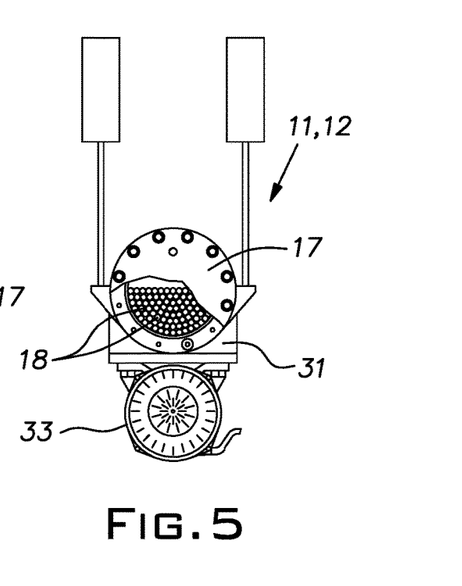
FIG. 5 is an end view of the rod mill of FIG. 3.

FIGS. 3-5 illustrate an example of a typical rod mill 11, 12 sometimes called a separator, that functions as described in section 1240 above. As discussed above and as displayed in FIG. 2, each stream of material employs a pair of mills 11, 12 in sequence. A mill 11, 12 is preferably a steel weldment including a cylindrical tube housing 16 closed at both ends with removable, bolted end plates 17.

As revealed in FIG. 5, the interior of the housing 16 is approximately half filled with parallel steel rods 18 slightly shorter than the inside length of the housing. Inlet and outlet tubes 21, 22 communicate with the interior of the housing 16 adjacent respective ends of the housing. A pair of semi-circular brackets 23 wrapped below the housing 16 enable the mill 11, 12 to be suspended by vertical rods 24. Upper ends of the suspension rods 24 are supported on compression springs 26 which isolate vibrational forces on the housing 16 from the station framework 27.

A set of D shaped brackets 31 are welded around the periphery of a mid-section of the housing 16 and to an underlying plate 32. A rotary electric vibratory motor 33 is bolted to the underside of the plate 32. The motor 33 is operable to torsionally vibrate the housing at 1200 vibrations per minute at 6 to 10 g's of acceleration, for example. By way of example, but not limitation, the housing can be 16 inches in outside diameter, 6 foot long, and the steel rods 18 can be 1 inch in diameter. The mechanical rod mill 11, 12 of the type disclosed herein, has been discovered to be surprisingly effective in crushing the higher density friable materials, primarily glass and rock, existing in ASR. Relatively little energy is consumed by such mills and wear of the mill components is negligible compared to that of other types of mechanical crushers.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A system for reclaiming metal by separating friable and non-friable parts of a high density portion of a mixed component waste material of automobile shredder residue or incinerator bottom ash with a predetermined particle size of 20 mm or less comprising:
    a vibratory rod mill disposed in a processing path, the vibratory rod mill having an elongated housing extending horizontally and elongated metal rods in the elongated housing aligned with a longitudinal axis of the elongated housing,
    a housing inlet adjacent one end of the elongated housing and a housing outlet adjacent an opposite end of the elongated housing, and
    a motor configured to torsionally vibrate the housing in a circular motion along an axis parallel to the housing axis, and
    a screen configured to receive material output of the rod mill and to separate particles of a predetermined size of 2 mm or less from a concentrated metal content remainder of the output.

2. The system of claim 1, including a second vibratory rod mill for receiving said remainder, and a second screen for receiving material processed in the second vibratory rod mill to separate particles of a certain size or less from larger particles constituting a further concentrated metal content remainder.

3. The system of claim 1, wherein the housing is partially filled with steel rod.

4. The system of claim 1, wherein the housing is suspended on springs.

5. An apparatus for reclaiming metals from incinerator bottom ash or automobile shredder residue having glass and/or rock waste, as well as metal content, with a predetermined particle size of 20 mm or less comprising:
    a first vibratory rod mill, disposed in a processing path, including a first elongated housing extending horizontally and first elongated metal rods in the first elongated housing aligned with a longitudinal axis of the first elongated housing, and
    a first housing inlet adjacent one end of the first elongated housing and a first housing outlet adjacent an opposite end of the first elongated housing, and
    a first motor configured to vibrate the first elongated housing torsionally around an axis parallel with the first elongated housing axis, and
    a feeder configured to feed ash or automobile shredder residue to the first vibratory rod mill, and
    a first screen configured to receive ash or automobile shredder residue material processed in the first vibratory rod mill, and
    a second vibratory rod mill, disposed in the processing path, including a second elongated housing and second elongated metal rods in the second elongated housing aligned with a longitudinal axis of the second elongated housing, and
    a second housing inlet adjacent one end of the second elongated housing and a second housing outlet adjacent an opposite end of the second elongated housing,
    a second motor configured to vibrate the second elongated housing torsionally around an axis parallel with the second elongated housing axis configured to receive ash or automobile shredder residue material not passing through the first screen and
    a second screen, with openings corresponding to a predetermined size of 2 mm or less, configured to receive material processed in the second vibratory rod mill,
    the vibratory rod mills and the screens being effective to separate said glass and/or rock waste from said metal content in said incinerator bottom ash or automobile shredder residue.

6. A method of reclaiming metal from ASR material or bottom ash material containing a friable part and a ductile part comprising feeding the material to a vibratory rod mill including an elongated housing and elongated rods in the housing aligned with a longitudinal axis of the housing, a motor for vibrating the housing torsionally around an axis parallel with the housing axis, operating the vibratory rod mill to crush friable parts of the material into particles of a predetermined size or less, directing material received from the vibratory rod mill to a screen with openings corresponding to said predetermined size, separating particles of said predetermined size or less from other parts of the material received from the vibratory rod mill with said screen to form a concentrated metal content remainder.

7. A method as set forth in claim 6, wherein the housing is partially filled with steel rods.

8. A method as set forth in claim 7, wherein the housing is suspended on springs.

9. A method as set forth in claim 6, wherein the remainder is directed into a second vibratory rod mill including an elongated housing and elongated rods in the housing aligned with a longitudinal axis of the housing, a motor for vibrating the housing torsionally around an axis parallel with the housing axis, operating the second vibratory rod mill to crush friable parts of the remainder into particles of an associated predetermined size, directing material received from the second vibratory rod mill to a second screen with openings corresponding to said associated predetermined size, separating particles of said associated predetermined size or less from other parts of the remainder received from the first mentioned vibratory rod mill with the second screen to form a concentrated metal content second remainder.

10. A system for recovering metal from automobile shredder residue or incinerator bottom ash feed material, having metal content, with a predetermined particle size of 20 mm or less, comprising:
a processing path for transporting the feed material between a receiving area and a recovery area and
a vibratory rod mill including an elongated housing in the processing path and extending horizontally and elongated metal rods in the elongated housing aligned with a longitudinal axis of the elongated housing, and
a housing inlet adjacent one end of the elongated housing and a housing outlet adjacent an opposite end of the elongated housing, and
a motor configured to vibrate the elongated housing torsionally around an axis parallel with the elongated housing axis for receiving the feed material from the receiving area, crushing friable components of the feed material and discharging the feed material including crushed friable components, and
a screen, with openings corresponding to a predetermined size of 2 mm or less, arranged to receive material discharged from the vibratory rod mill and configured to separate the crushed material on the basis of particle size passing or not passing through the screen such that metals not passing through the screen are directed to the recovery area.

11. A system as set forth in claim 10, wherein the housing has an inlet for feed material adjacent one end and an outlet for feed material adjacent an opposite end.

12. A system as set forth in claim 10, wherein the motor produces a torsional acceleration of the housing of 6 to 10 g's.

13. A system as set forth in claim 10, wherein the housing is constructed and arranged to be inclined or declined to adjust the residence time of feed material in the housing.

14. A system as set forth in claim 10, including apparatus in said path upstream of said vibratory rod mill separating low density material of a bulk density below 70 to 100 lbs/ft$^3$, from high density material of a bulk density of 70 to 100 lbs/ft$^3$.

15. A system as set forth in claim 10, wherein the screen has openings of between 0.7 and 1.5 mm for receiving and separating feed material discharged from said vibratory rod mill.

16. A system as set forth in claim 10, wherein the path includes a second vibratory rod mill in series with said first mentioned rod mill and upstream of said recovery area.

17. A system as set forth in claim 16, including a second screen arranged to receive material discharged from the second vibratory rod mill, the second screen having openings sized to concentrate metal by restricting passage of metal products therethrough while allowing passage therethrough of particles of a size smaller than the metal particles.

* * * * *